(12) United States Patent
Kent et al.

(10) Patent No.: US 9,699,238 B2
(45) Date of Patent: *Jul. 4, 2017

(54) IMAGE DISPLAY SYSTEM WITH VISUAL SERVER

(71) Applicant: Intellectual Pixels Limited, Jersey (GB)

(72) Inventors: Osman Kent, Surrey (GB); David R. Baldwin, Surrey (GB); Nicholas J. N. Murphy, Surrey (GB)

(73) Assignee: INTELLECTUAL PIXELS LIMITED, Jersey (GB)

( * ) Notice: Subject to any disclaimer, the term of this patent is extended or adjusted under 35 U.S.C. 154(b) by 217 days.

This patent is subject to a terminal disclaimer.

(21) Appl. No.: 14/192,789

(22) Filed: Feb. 27, 2014

(65) Prior Publication Data
US 2014/0179433 A1 Jun. 26, 2014

Related U.S. Application Data

(63) Continuation of application No. 13/296,776, filed on Nov. 15, 2011, now Pat. No. 8,667,093, which is a
(Continued)

(51) Int. Cl.
*G06F 15/16* (2006.01)
*H04L 29/08* (2006.01)
(Continued)

(52) U.S. Cl.
CPC ............. *H04L 67/00* (2013.01); *A63F 13/12* (2013.01); *G06T 9/00* (2013.01); *G06T 15/005* (2013.01);
(Continued)

(58) Field of Classification Search
CPC .............................. H04L 67/00; H04L 65/605
See application file for complete search history.

(56) References Cited

U.S. PATENT DOCUMENTS 5,550,962 A 8/1996 Nakamura et al.
5,742,289 A 4/1998 Naylor et al.
(Continued)

FOREIGN PATENT DOCUMENTS

WO 0077739 A1 12/2000

OTHER PUBLICATIONS

"U.S. Appl. No. 10/037,688, Advisory Action mailed May 10, 2007", 3 pgs.
(Continued)

*Primary Examiner* — Yves Dalencourt
(74) *Attorney, Agent, or Firm* — Kwan & Olynick LLP

(57) ABSTRACT

An image display system with one or more client computers in selective communication with a visual server having image processing capabilities. The client computer generates image-modifying data corresponding to a generated image, and transmits the data to the visual server. The visual server receives the image-modifying data, generates a modified image based upon the image-modifying data, and transmits the modified image as compressed data to the client. The client decompresses the modified image data and displays the modified image. In the system, the visual server and client can provide a sequential display of modified frames on client to support animation with complex 3-dimensional graphics.

20 Claims, 4 Drawing Sheets

Related U.S. Application Data continuation of application No. 12/538,347, filed on Aug. 10, 2009, now Pat. No. 8,131,826, which is a continuation of application No. 10/037,688, filed on Jan. 4, 2002, now Pat. No. 7,587,520.

(60) Provisional application No. 60/263,854, filed on Jan. 24, 2001.

(51) Int. Cl.
*H04L 29/06* (2006.01)
*G06T 9/00* (2006.01)
*G06T 15/00* (2011.01)
*A63F 13/30* (2014.01)

(52) U.S. Cl.
CPC ........ *H04L 65/607* (2013.01); *G06T 2200/16* (2013.01)

(56) References Cited

U.S. PATENT DOCUMENTS

| | | | |
|---|---|---|---|
| 5,790,792 | A | 8/1998 | Dudgeon et al. |
| 5,801,711 | A | 9/1998 | Koss et al. |
| 6,055,229 | A | 4/2000 | Dorenbosch et al. |
| 6,057,852 | A | 5/2000 | Krech, Jr. |
| 6,094,453 | A | 7/2000 | Gosselin et al. |
| 6,205,582 | B1 | 3/2001 | Hoarty |
| 6,344,852 | B1 | 2/2002 | Zhu |
| 6,377,257 | B1 * | 4/2002 | Borrel ............... G06T 15/005 345/419 |
| 6,384,821 | B1 * | 5/2002 | Borrel ............... G06T 15/00 345/421 |
| 6,438,575 | B1 | 8/2002 | Khan et al. |
| 6,603,470 | B1 | 8/2003 | Deering |
| 6,628,282 | B1 | 9/2003 | Hertzmann et al. |
| 6,658,167 | B1 | 12/2003 | Lee et al. |
| 6,929,549 | B1 | 8/2005 | Yamada |
| 7,587,520 | B1 | 9/2009 | Osman et al. |
| 8,131,826 | B2 | 3/2012 | Kent et al. |
| 8,560,643 | B2 | 10/2013 | Kent et al. |
| 8,667,093 | B2 | 3/2014 | Kent et al. |
| 9,106,605 | B2 | 8/2015 | Kent et al. |
| 2002/0082082 | A1 | 6/2002 | Stamper et al. |
| 2010/0201696 | A1 | 8/2010 | Kent et al. |
| 2012/0100913 | A1 | 4/2012 | Kent et al. |
| 2012/0142426 | A1 | 6/2012 | Kent et al. |
| 2014/0040358 | A1 | 2/2014 | Kent |

OTHER PUBLICATIONS

"U.S. Appl. No. 10/037,688, Examiner Interview Summary mailed Nov. 28, 2007", 3 pgs.

"U.S. Appl. No. 10/037,688, Final Office Action mailed Jan. 19, 2007", 9 pgs.

"U.S. Appl. No. 10/037,688, Non Final Office Action mailed Apr. 21, 2005", 12 pgs.

"U.S. Appl. No. 10/037,688, Non Final Office Action mailed May 9, 2006", 9 pgs.

"U.S. Appl. No. 10/037,688, Non Final Office Action mailed Aug. 10, 2007", 8 pgs.

"U.S. Appl. No. 10/037,688, Non Final Office Action mailed Oct. 5, 2005", 9 pgs.

"U.S. Appl. No. 10/037,688, Notice of Allowance mailed Mar. 23, 2009", 11 pgs.

"U.S. Appl. No. 10/037,688, Restriction Requirement mailed Jul. 25, 2008", 6 pgs.

"U.S. Appl. No. 12/538,347, Examiner Interview Summary mailed May 11, 2011", 2 pgs.

"U.S. Appl. No. 12/538,347, Non Final Office Action mailed Jul. 21, 2011", 6 pgs.

"U.S. Appl. No. 12/538,347, Non Final Office Action mailed Sep. 1, 2010", 10 pgs.

"U.S. Appl. No. 12/538,347, Notice of Allowance mailed Oct. 26, 2011", 5 pgs.

"U.S. Appl. No. 13/282,200, Non Final Office Action mailed Dec. 26, 2012", 13 pgs.

"U.S. Appl. No. 13/282,200, Notice of Allowance mailed Jun. 13, 2013", 10 pgs.

"U.S. Appl. No. 13/296,776, Examiner Interview Summary mailed Sep. 18, 2013", 3 pgs.

"U.S. Appl. No. 13/296,776, Non Final Office Action mailed May 15, 2013", 11 pgs.

"U.S. Appl. No. 13/296,776, Non Final Office Action mailed Dec. 19, 2012", 10 pgs.

"U.S. Appl. No. 13/296,776, Notice of Allowance mailed Oct. 30, 2013", 7 pgs.

"U.S. Appl. No. 13/296,776, Restriction Requirement mailed Apr. 24, 2012", 6 pgs.

"The G-cluster Game Portfolio", G-Cluster Ltd., Printouts from WorldWide Web. gcluster.com, 2002, 23 pgs.

Agrawala, Maneesh et al., "Model-Based Motion Estimation for Synthetic Animations", AMC Multimedia 95-Electronic Proceedings; Nov. 5-9, WorldWide Web-Graphics.Stanford.edu/papers/model based, 1995, 1-18.

Bharadvaj, Harini et al., "An Active Transcoding Proxy to Support Mobile Web Access", Department of Computer Engineering & Computer Science. University of Missouri-Columbia, Oct. 20-23, 1998.

Guenter, Brian K. et al., "Motion Compensated Compression of Computer Animation Frames", 7 pgs.

Wallach, Dan S. et al., "Accelerated MPEG Compression of Dynamic Polygonal Scenes", Computer Graphics (Poc. Siggraph 1994), 3 pgs.

U.S. Appl. No. 14/052,659, Notice of Allowance mailed Jun. 23, 2015, 5 pgs.

"U.S. Appl. No. 14/052,659, Non Final Office Action mailed Dec. 2, 2014", 6 pgs.

* cited by examiner

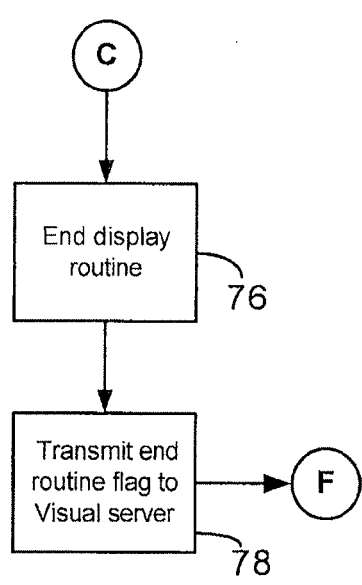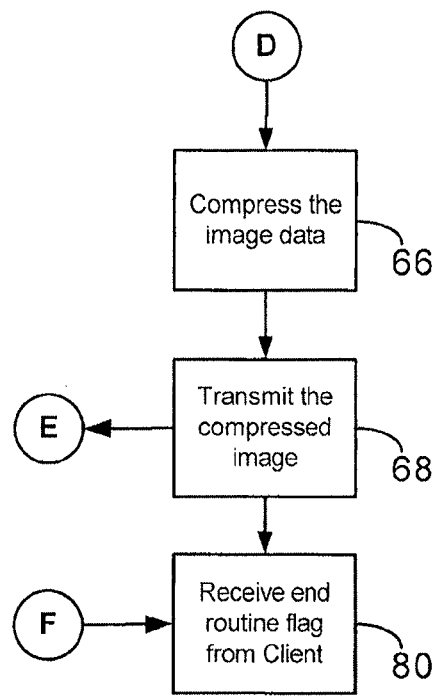
Fig. 2C
Fig. 2D

IMAGE DISPLAY SYSTEM WITH VISUAL SERVER

CROSS-REFERENCE TO RELATED APPLICATION

This application is a continuation of U.S. application Ser. No. 13/296,776, filed Nov. 15, 2011, and titled "IMAGE DISPLAY SYSTEM WITH VISUAL SERVER", which is a continuation of U.S. application Ser. No. 12/538,347, filed Aug. 10, 2009, and titled "IMAGE DISPLAY SYSTEM WITH VISUAL SERVER", now issued as U.S. Pat. No. 8,131,826, which is a continuation of U.S. application Ser. No. 10/037,688, filed Jan. 4, 2002, and titled "IMAGE DISPLAY SYSTEM WITH VISUAL SERVER", now issued as U.S. Pat. No. 7,587,520, which claims priority to U.S. Provisional Application No. 60/263,854, filed Jan. 24, 2001 and titled "VISUAL SERVER", all of which are incorporated by this reference in their entireties for all purposes.

BACKGROUND OF THE INVENTION

1. Field of the Invention

The present invention generally relates to computer systems. More particularly, the present invention relates to computer graphics and a graphical image display system that use a visual server to generate and transmit images to a client.

2. Description of the Related Art

Computer generated images are created in a series of several steps: modeling, or describing the objects in mathematical terms; animation, or describing how the objects move over time; and rendering, or determined which of the images defined by the modeling and animation programs are visible on the screen for every frame, assigning color to those images, and drawing them. Of these, rendering is the most difficult as it is the most processing intensive action. Because the generation of images is both processing and memory intensive, a client computer often relies upon other processors and memories, such as a server, to assist in generating the data to render new images. In the existing network model, storage and caching of content and applications can occur on a centralized server, but the actual software applications execute on a system in the client user space. The network thus allows the server to supply image processing resources beyond the constraints of a remote terminal, while taking advantage of client resources for certain tasks. Several existing systems utilize the client-server model to process and render images at a client display with the assistance of server resources.

In methods of client-server graphics that employ image transmission, the server unit requires a relatively high bandwidth connection even if real-time image compression and decompression is employed. Even in geometric replication methods, such as VRML, which generally have a lower bandwidth requirement, the image processing does not decrease the storage or processing requirements of the client. In these systems, the client must be capable of 30 rendering the complete replicated database in real time, and the server does not provide true image generation services. Rather, the server functions primarily as a database server. For example, in a client-server method based on a hybrid image transmission and geometry transmission approach, the server unit maintains a low level-of-detail database and a high level of detail database. For each frame of a real-time image stream, images are generated from both the low level-of-detail and high level-of-detail database. The difference between the two images is computed using known methods of image processing. The client unit contains only a low level-of-detail geometric database and renders this database for each frame, and the difference image computed on the sever is compressed and transmitted to the client in real-time which decompresses and composites it together with the image generated by the client from the low level-of-detail database. The result is a high level-of-detail, high quality image that requires a relatively low transmission bandwidth to transmit the relatively low information difference image. Such method also requires relatively limited client storage and processing capabilities. While this method can decrease the computational load of the client and reduce the communication costs, it requires both real-time image compression and decompression and further requires that special image compositing be added to the pipeline. In addition, the entire low level-of-detail database must be stored and processed by the client.

Another known method of client-server image processing is transmitting a transformed and compressed low level-of-detail representation of the geometric database in screen-space representation from the client to the server. The low level-of-detail geometric primitives are transmitted for every frame, and such action increases the required connection bandwidth. Only the primitives that are actually visible for each frame need to be transmitted in this approach. Moreover, since primitives visible in a current frame are likely to be visible in a subsequent frame, the repeated transmission of primitives that have been transformed to image-space representation is an inefficient use of available bandwidth. Any processing to identify repetitive primitives requires further client resources, which hampers the image displaying process.

A further approach to distributed client-server image generation is based on demand-driven geometry transmission to the client. In this method, the server determines and periodically updates a list of potentially visible primitives for each client using a spherical clipping volume around a viewpoint. The result is then compared to a list of primitives previously transmitted to the corresponding client and only those potentially visible primitives that have not been previously transmitted are sent to the client. However, this method reduces communication cost by limiting transmission to those primitives that have become potentially visible. The client replaces primitives in the client display list when they are no longer included in the spherical clipping volume, and thus, the storage and computing requirements of the client are limited to only those primitives in the potentially visible set. However, as this method uses a limited inclusion volume, a major disadvantage is that distant primitives can be arbitrarily excluded from the potentially visible data set. Further, the use of a spherical inclusion volume results in the inclusion and transmission of a large number of geometric primitives that are not visible in the current frame and are unlikely to be visible in upcoming frames, an example being primitives in the inclusion sphere behind the viewpoint. As a result, the demand-driven geometry transmission makes inefficient use of available transmission bandwidth and available client storage and computing resources, and the client resources are taxed because the client must compute removal of primitives by clipping to the inclusion volume, and implement display list replacement and compaction protocols.

Client graphic image display processing capabilities are even further taxed in the display of 3-dimensional images. In existing clients, the implementation of a system delivering 3D graphics requires graphics hardware at the client, which presents several problems. The additional hardware increases the cost of the client hardware as the graphics hardware must be incorporated and integrated therewith. Further, the software and hardware used to generate 3D images is in constant flux, and the system must be continually upgraded, creating an additional expense and a logistical burden for the client. Moreover, the remote hardware impedes the central maintenance and coordination of configurations of client software, which is an important capability and critical to the product viability of many applications.

Some clients use separate 3D hardware component to assist in processing the images, but with the constant change of graphics languages and protocols, the hardware becomes obsolete rather quickly, which adversely impacts the value of the client. Furthermore, the use of programmable graphics hardware within the client system is difficult because the client resources are inherently static and limited.

Therefore, for reasons of cost, size, and power consumption, sophisticated three dimensional graphics are not available on common consumer client devices such as personal digital assistants (PDAs) mobile telephones and set-top boxes used to decode cable and satellite television signals. Consequently, it would be advantageous to display complex three dimensional graphics, such as those used by games, on these consumer client devices.

Accordingly, it is to the provision of such an improved system and method of displaying images on a client consumer device utilizing the resources of a visual server that the present invention is primarily directed.

SUMMARY OF THE INVENTION

The present invention is an image display system and method of displaying images on a client through the use of the resources of a remote visual server. The Visual Server runs standard software, such as games, that are the same as versions running on standard personal computers. The Visual Server has certain support software modified to enable control of the application from the client and the delivery of the result of 3D drawing to the client. One or more clients can access the visual server, or an array of servers, wherein each of the clients includes an image display. The system includes a visual server having image data processing capabilities wherein the server selectively receives image-modifying data from one or more clients corresponding to a generated image, and the server generates a modified image based on the image-modifying data, and then transmits the modified image as compressed data back to the client.

The clients are in selective communication with the visual server, and each client selectively generates image-modifying data corresponding to the image resident on the image display of that specific client. The client selectively transmits the image-modifying data to the visual server, and the client then receives, as compressed data from the visual server, an image, or data representing an image, which is a modification of the previous image on the client altered in accord with the previously transmitted image-modifying data. The client includes the processing ability to uncompress the compressed image data from the visual server, and display the image defined by the decompressed data on the client image display.

The visual server and the one or more clients are in selective digital or analog communication preferably across a network, such as an Ethernet, WAN, LAN, or the Internet. Alternately, the visual server and one or more clients are in selective wireless communication, either point-to-point or relayed.

In generating the image-modifying data at the client and processing the image-modifying data at the visual server, the typical data processing segment is a frame. Alternately, the image-modifying data can be generated and transmitted from the client, and the modified image data sent from the visual server to the client after predetermined duration has elapsed.

The present invention further includes a method of displaying an image on a client in selective communication with a visual server wherein the method includes the steps of generating image-modifying data at the client wherein the image-modifying data corresponds to a generated image, transmitting the image-modifying data from the client to the visual server, receiving at the visual server image-modifying data from the client, generating at the visual server a modified image based upon the image-modifying data received from the client, transmitting the modified image from the visual server to the client as compressed data, receiving at the client as compressed data from the visual server an image modified by the transmitted image-modifying data, uncompressing the compressed image data at the client, and displaying the decompressed image on the client image display. The method alternately further includes the step of transmitting a link or other flag to the visual server from the client prior to the step of transmitting the image-modifying data from the client to the visual server in order to notify the visual server that image-modifying data is about to be transmitted from the client.

In the preferred embodiment, the steps of transmitting the image-modifying data from the client to the visual server and transmitting the modified image from the visual server to the client as compressed data are performed across a network, such as the Internet or other WAN, LAN, or Ethernet. Alternately, the steps of transmitting the image-modifying data from the client to the visual server and transmitting the modified image from the visual server to the client as compressed data are performed through wireless communication.

In one embodiment of the system, the step of transmitting the modified image from the visual server to the client as compressed data is transmitting the modified image from the visual server to the client as a compressed data comprising a frame, and accordingly, the step of transmitting the image-modifying data from the client to the visual server is transmitting the image-modifying data from the client to the visual server as data sufficient to generate an image frame. In another embodiment, the step of transmitting the modified image from the visual server to the client as compressed data is transmitting the modified image to the client after predetermined duration of generating an image based upon the transmitted image-modifying data has occurred, and accordingly, the step of transmitting the image-modifying data from the client to the visual server is transmitting the image-modifying data from the client to the visual server after a predetermined duration of generating image-modifying data.

The present invention therefore provides a commercial advantage in that the client can interactively generate complex graphical images to a user without the need for significant client resources. The system can be implemented with existing networking and communication technology between the client and the visual server, and the image data can be transmitted with known data compression protocols. Further, the visual server and its associated components are readily updateable and maintainable without having to directly access the individual client applications utilizing the image generating capabilities of the visual server.

Other objects, features, and advantages of the present invention will become apparent after review of the hereinafter set forth Brief Description of the Drawings, Detailed Description of the Invention, and the Claims.

BRIEF DESCRIPTION OF THE DRAWINGS

FIG. 2C is a continuation of the flowchart of FIG. 2A.

FIG. 2D is a continuation of the flowchart of FIG. 2B.

DETAILED DESCRIPTION OF THE INVENTION

Figure 1:
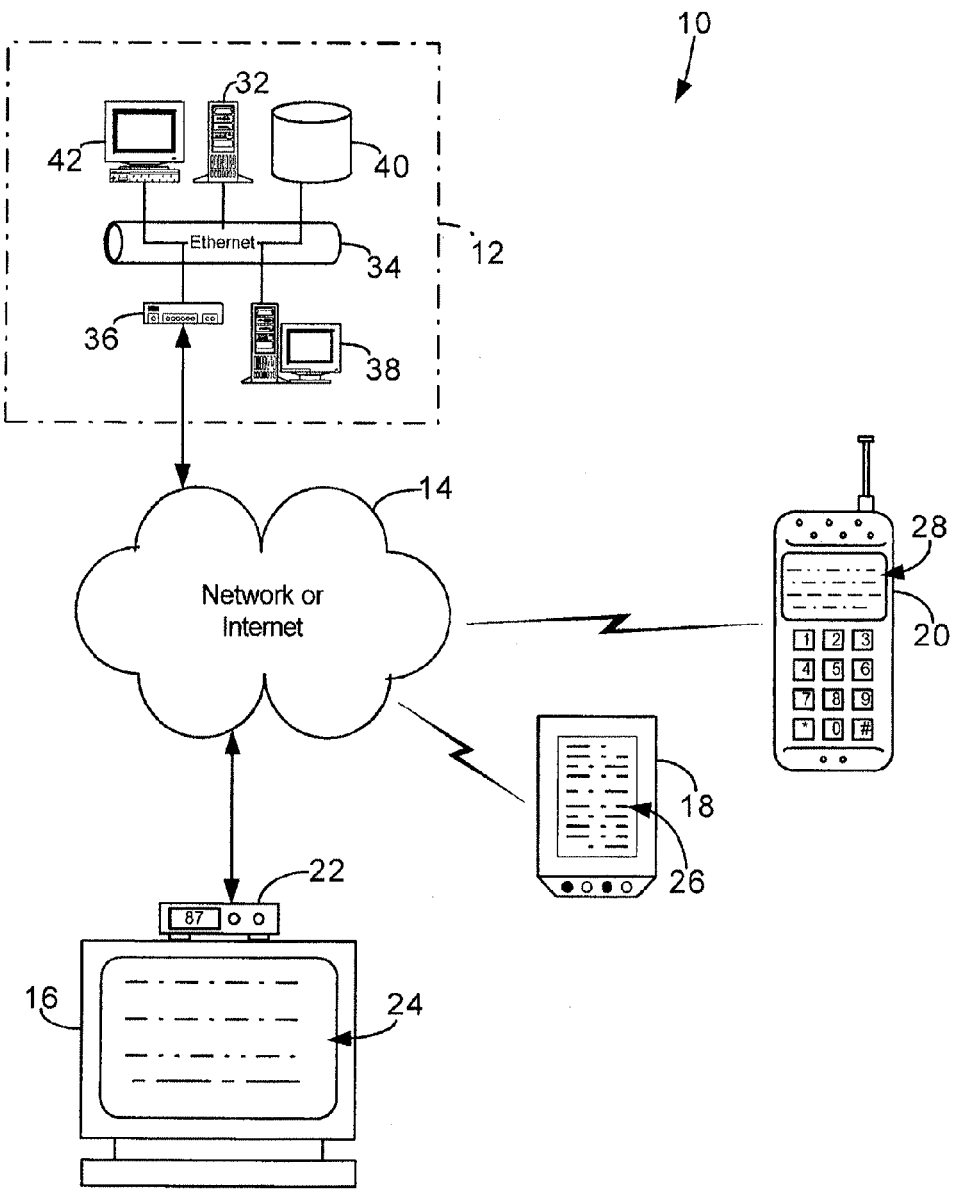
FIG. 1 is a representational diagram of the image display system with a visual server and associated components in selective communication with a plurality of clients across a network.

With reference to the figures in which like numerals represent like elements throughout, FIG. 1 is representational diagram of the image display system 10 with a visual server 12 and associated components in selective communication with a plurality of clients across a network 14, such as the Internet. The client components are shown as a television 16 having a set-top box 22 in communication with the network 14, and the set-top box 22 can selectively provide image data to the display 24 of the television 16. Set-top box 22 is similar to the type of boxes generally extant, except that the set-top box 22 in the present system must be able to receive and decompress compressed image data from the visual server 12. The same capability must be present in any client device in order to have the advantages of using the present system 1 0 for image data processing. Another exemplary clients are PDA 18, such as a Palm Pilot or a Handspring Visor, which has a display screen 26, and cellular telephone 20, which includes a display screen 28. The PDA 18 and cellular telephone 20 are shown here as communicating with the network 14 via a wireless connection, such as an infrared, radio frequency, or microwave transmission. However, PDA 18 and cellular telephone 20 can be in direct wireless communication with the visual server 12 solely through wireless communication.

The visual server 12 is shown here as a cluster of devices, including a server 32, which are in communication through an Ethernet 34, and a hub 36 links the Ethernet 34 to the Internet or other network 14. Thus, while the present inventive system 1 0 can be implemented with only a server, such as server 32, in communication with the network 14, the visual server 12 here includes additional components that can facilitate the image processing at the visual server 12. An additional server 38 can support the visual server, as well as a database 40 for storing the image related information such as the specific graphical application programming interface that the client 16,18,20 requires for the modified image, such as Open GL or Direct3D. Additional computers, such as computer 42, can be connected to the server 32 or to the Ethernet 34 to support the image processing, and provide server maintenance and upgrades. Accordingly, the visual server 12 configuration is readily scalable as would be apparent to one of skill in the art.

The communication between the visual server 12 and client preferably occur over a high bandwidth connection such that 1 Mbps or greater data can be sent across the network. However, the client bandwidth can be asymmetric, with the high-bandwidth reserved for visual server 12 to client 16,18,20 communication, an example being a DSL. With the use of an asymmetric connection, the lesser volume of image-modifying data can be transmitted on the lower bandwidth link from the client 16,18,20 to the visual server 12, and the more significant compressed image data can travel across the high bandwidth portion of the connection from the visual server 12 to the client 16,18,20 for decompression and display. Through the use of adequate bandwidth, substantial image data can be transmitted from the visual server 12 to the client 16,18,20, approaching real-time speeds which can allow multimedia applications to be displayed on the clients 16,18,20, such as games and other graphic-intensive applications.

In operation of the image display system I 0, the visual server 12 selectively receives image-modifying data from the client 16,18,20 corresponding to a generated image, such as that generated by a game being played on the client, or a multimedia application being executed on the client. The visual server 12 then generates a modified image based upon the image-modifying data, compresses the image or image data with a specific "codec" (compression/decompression) algorithm, and transmits the modified image as compressed data back to the client 16, 18,20. The visual server 12 can either generate a full image modified with the image-modifying data from the client and then compress the generated image, or the visual server 12 can solely generate the data in a specified format for the modified image and have that 30 data compressed and transmitted. Thus, in the system 1 0, the visual server 12 can generate only the data necessary to render an image at the client, and does not need to fully produce an image at the visual server prior to compression.

The client 16,18,20 selectively generates image-modifying data and transmits the image-modifying data to the visual server 12 and awaits the image data from the visual server 12 for the next requested image. Once the client receives the modified image as compressed data from the visual server 12, the client 16,18,20 then decompresses the compressed image data and displays the decompressed image on the client image display 24,26,28. The modified image data can be compressed at the visual server 12 in any compression standard, such as MPEG, JPEG, H.261, or other industry standard codecs, and streaming formats such as Windows Media .ASF standard, Real .RM standard, Apple .MOV standard. The client 16,18,20 includes the requisite hardware and software to decompress the modified image.

If the system 10 is displaying a series of images on the client 16, 18,20, such as in multimedia animation, the visual server 12 transmits the modified image to the client 16,18,20 as a frame, and preferably but not necessarily, the client 16,18,20 transmits the image-modifying data to the visual server 12 as data sufficient to generate an image frame. Otherwise, the visual server 12 can transmit the modified image to the client 16,18,20 in an arbitrary predetermined manner, such as after predetermined duration of generating an image based upon the transmitted image-modifying data has occurred, or after a predetermined amount of data has been received from the client 16, 18,20. The client 16,18,20 can likewise transmits the image-modifying data to the visual server 12 in an arbitrary manner, such as after a predetermined duration of generating image-modifying data has occurred, or a specific amount of image-modifying data is ready to be sent.

In the art currently, when the client 16,18,20 is active, the client 16,18,20 is in communication with networks and can be supported by a one or more servers. Consequently, the visual server 12 is able to utilize existing architectures with the higher bandwidth, asymmetric or other, to handle complex visual processing for the client 16, 18,2, or the ultimate recipient of the processed data. The visual server 1 2 can also run standard software application, such as games, that are the same as versions running on standard personal computers, with the visual server 12 providing the computing power of the PC to the data generated at the client 16,18,20 for purposes of image modification.

It can be seen that the visual server 12 has, either in software or hardware, an image processor that selectively receives image-modifying data corresponding to a generated image from the client 16,18,20, and the image processor generates a modified image based upon the image-modifying data and then transmits the modified image as compressed data to the client 16,18,20. Further, each client 16,18,20 can have, either embodied in hardware or software, in additional to the image display 24,26,28 for displaying an image to a user of the client 16, 18,20, an image-modifying data generator that generates image-modifying data, and image-modifying data transmitter for transmitting the image-modifying data to the visual server 12, and a modified image data receiver for receiving as compressed data from the visual server 12 an image modified based the transmitted image-modifying data from the client 16,18,20, and the modified image data receiver decompresses the compressed image data.

Figure 2A:
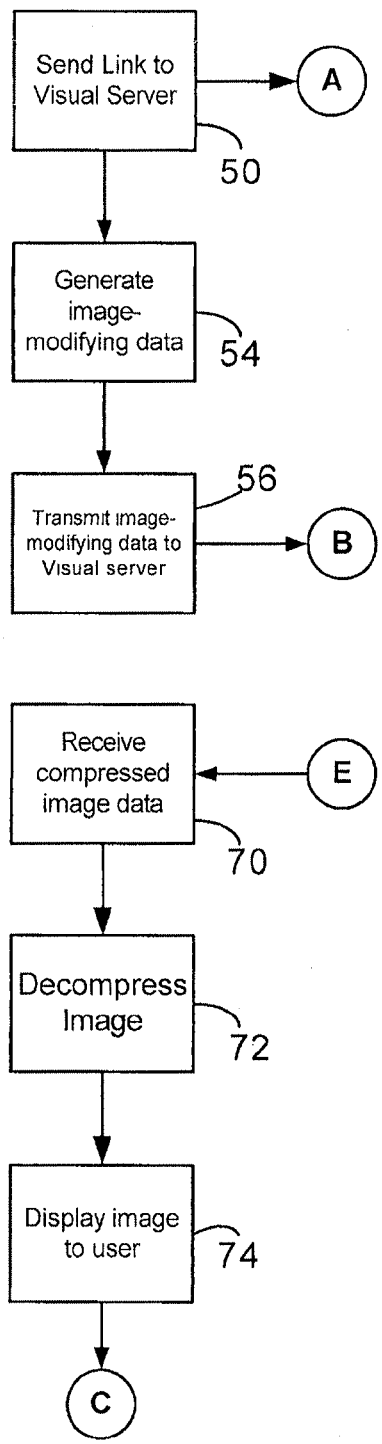
FIG. 2A is a flowchart illustrating the preferred process executed on the client in selective communication with the visual server to facilitate image generation.
Figure 2B:
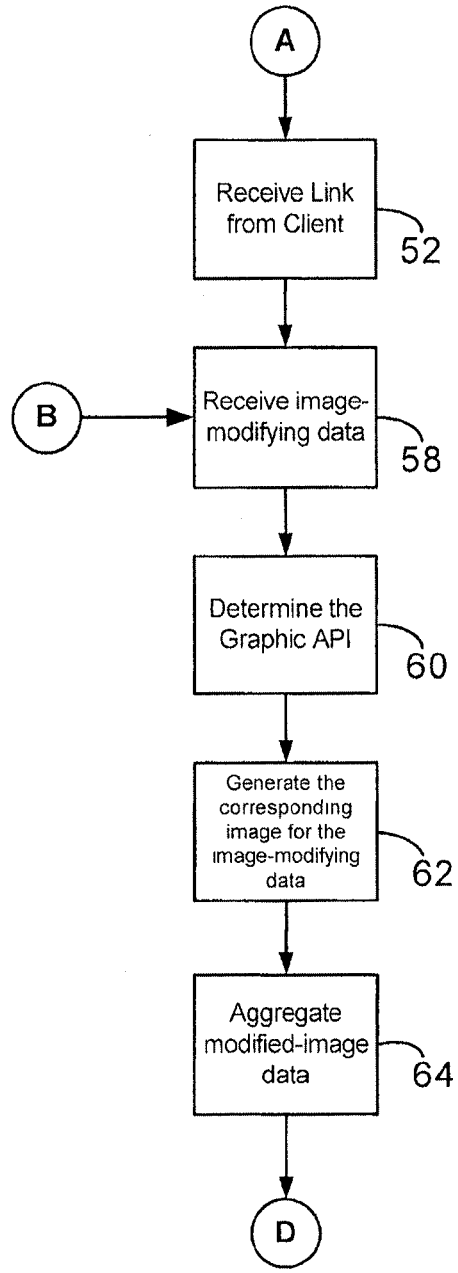
FIG. 2B is a flowchart illustrating the preferred process executed on the visual server in receiving image-modifying data from the client, and then generating and transmitting a modified image to the client.
Figure 3:
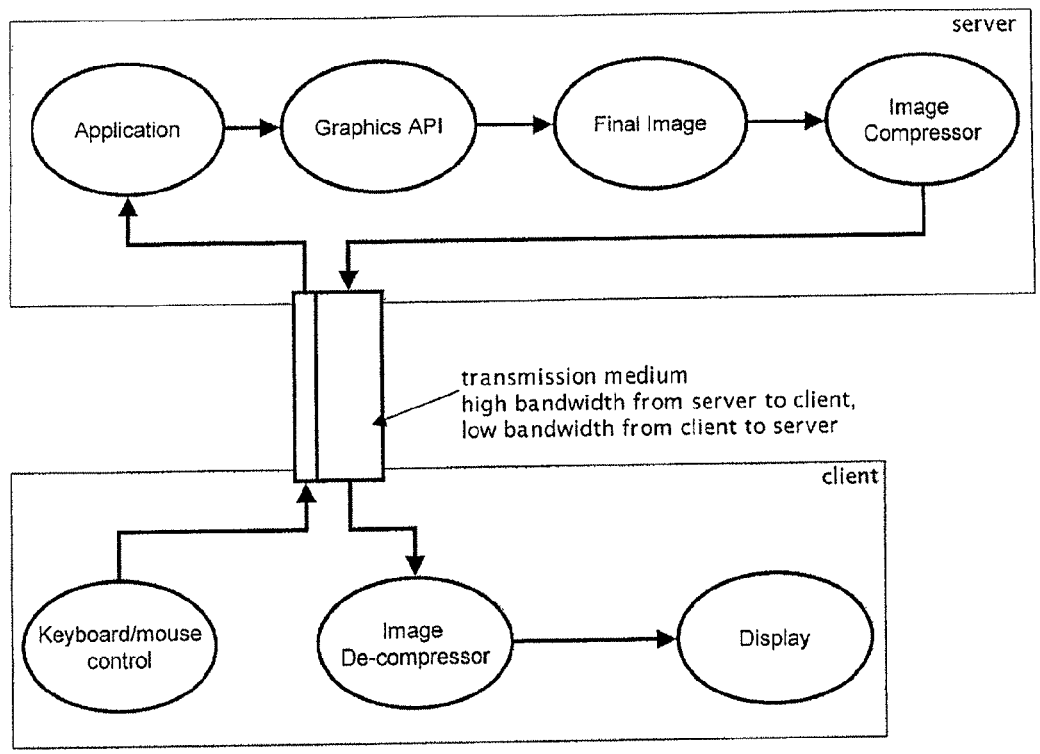
FIG. 3 shows a schematic of data and procedural flow in an inventive embodiment.

FIGS. 2A-2D illustrate the process thread of the image display system 10, with FIGS. 2A and 2C representing the client platform, and FIGS. 2B and 2D representing the visual server 12 platform. The thread preferably begins with the step of sending a link to the visual server, step 50, which indicates that the client 16,18,20 is about to send image-modifying data to the visual server. The link can be a flag at the beginning of a frame or packet, or can be separate from the frame or packet. The visual server 12 receives the link from the client, as shown at step 52, and then can make any necessary resource allocations for use in the image-modification process. The step of sending a link is not necessary if the visual server 12 is able to have sufficient turn around processing on frames and packets send without advanced warning from the client 16,18,20. Then the client 16,18,20 generates image-modifying data, as shown at step 54, and transmits the image-modifying data to the visual server 12, as shown at step 56.

The thread then continues at the visual server 12 which receives the image-modifying data from the client 16, 18,20, as shown at step 58, where the image-modifying data corresponds to an image in a graphics API recognizable to the visual server 12. Thus, if a link was sent to the visual server 12 from the client 16,18,20 (steps 50 and 52), the visual server can determine the appropriate graphics API in anticipation of receipt of the image-modifying data. The visual server 12 otherwise determines the graphic API, as shown at step 60, based upon the image-modifying data receiving, and then generates the corresponding modified image based upon the image-modifying data received from the client 16, 18,20, as shown at step 62. If the image data requires aggregation to complete the image, then the visual server 12 aggregates the data, as shown at step 64, and if not, once the modified image, or data comprising the modified image is generated, the visual server 12 compresses the image data in a predetermined format, such as MPEG, as shown at step 66, and then transmits the modified image from the visual server 12 to the client 16,18,20 as compressed data, as shown at step 68.

The thread then continues at the client 16,18,20, with the client receiving the compressed data from the visual server 12, as shown at step 70, where the compressed data is an image modified based the transmitted image-modifying data, and the client 16,18,20 decompresses the compressed image data, as shown at step 72. The client 16,18,20 then displays the decompressed image on the client image display, such as displays 24,26,28. The client then ends the particular display routine of the thread, as shown at step 76, and can begin to generate new image modifying data. The client 16,18,20 alternately process new image-modifying tying data while the current image is being displayed. Further, as embodied here, the client 16,18,20 transmits an end routine flag to the visual server, as shown at step 78, to indicate that the client successfully received and displayed the frame. The visual server 12 then receives the end routine flag, as shown at step 80, which allows the visual server 12 to deallocate the resources set aside for the specific image processing requested initially by the client 16,18,20 at step 50. The step of transmitting an end routing flag from the client (step 78) and the receipt of the flag at the visual server 12 (step 80) are not required, but do assist in the visual server 12 management of resources. Other methods of client-server interaction through packet and frame-relay networks as would be known to those of skill in the art can be used to control interaction between the clients 16,18,20 and visual server 12 in the present system 10.

If the client 16,18,20 and visual server 12 data transfers occur through the use of frames, the step of transmitting the modified image from the visual server 12 to the client 16,18,20 as compressed data is transmitting the modified image from the visual server 12 to the client 16,18,20 as a compressed data comprising a frame. Likewise, the step of transmitting the image-modifying data from the client 16,18, 20 to the visual server 12 is preferably transmitting the image-modifying data from the client 16, 18,20 to the visual server 12 as data sufficient to generate an image frame. Alternately, if the client and visual server 12 transfer data based upon an arbitrary method such as elapse of a predetermined duration, then the step of transmitting the modified image from the visual server 12 to the client 16,18,20 as compressed data is transmitting the modified image to the client 16,18,20 after predetermined duration of generating an image based upon the transmitted image-modifying data has occurred at the visual server 12. In such embodiment, the step of transmitting the image-modifying data from the client 16,18,20 to the visual server 12 is transmitting the image-modifying data from the client 16,18,20 to the visual server 12 after a predetermined duration of the client generating image-modifying data.

While there has been shown a preferred and alternate embodiments of the present invention, it is to be understood that certain changes may be made in the forms and arrangement of the elements and steps of the method without departing from the underlying spirit and scope of the invention as is set forth in the claims.

For reasons of cost, size, and power consumption, sophisticated three dimensional graphics are not available on devices such as mobile telephones and the set-top boxes used to decode cable and satellite television signals. There is, however, a need to display complex three dimensional graphics, specifically those used by games, on these devices.

We have solved this problem by recognizing that another common element of these devices is connectivity; when the device is active it is connected to a service provider and hence already follows the model of a client device supported by a server device. Extending this analogy we have developed the concept of a Visual Server that handles all complex visual processing, and a client (the telephone or set-top box) that receives the processed data.

The Visual Server runs standard software, such as games, that are the same as versions running on standard personal computers. The Visual Server has certain support software modified to enable control of the application from the client and the delivery of the result of 3D drawing to the client.

The application running on the Visual Server sends drawing commands to one of the industry standard application programming interfaces such as Direct3D or OpenGL. When the drawing is complete the resulting image is compressed and transmitted to the client using a protocol such as MPEG4. The transmission of the compressed image usually occurs on completion of a frame; in the event that there is no distinct end to a frame the transmission occurs after a specified elapsed time.

The use of an industry standard image compression protocol such as MPEG allows us to make use of facilities that are already present in most clients. Set-top boxes already need to decode MPEG data in order to display digital television; mobile telephones will soon need to support MPEG protocols for video conferencing or television display.

The main advantages of this invention are:
1. The ability to display complex 3D graphics on a device lacking necessary hardware.
2. The avoidance of costly components in the client device and taking advantage of necessary functions already present in it.
3. The ability to provide access to industry standard software on a device which is unable to execute that software.
4. The ability to upgrade performance and features needed by applications at the server without modifying the more numerous clients.
5. The avoidance of installing numerous applications on each client with the consequential support problems; the client software can be installed when shipped from the factory.

The invention claimed is:

1. A method comprising:
sending image-modifying data corresponding to a generated image from a client device;
receiving, from a server, 3-dimensional graphics comprising a compressed modified image based on the image-modifying data; and
displaying said 3-dimensional graphics at the client device such that complex interactive games can be displayed at the client device in real-time, wherein said client device decompresses the compressed modified image but does not perform 3-dimensional graphics processing on said 3-dimensional graphics, and wherein said client device is separate from said server.

2. The method of claim 1, wherein said receiving is performed across at least one of an Internet, a WAN, a LAN, an Ethernet, or wireless communication.

3. The method of claim 1, further comprising sending user input control signals to the server, which generates the 3-dimensional graphics accordingly.

4. The method of claim 3, wherein said sent user input control signals are sent after a specified elapsed time.

5. The method of claim 3, wherein said user input control signals are generated by a game input device.

6. A method comprising:
receiving, at a server, image-modifying data corresponding to a generated image from a client device;
generating, at the server, at least one image portion of a 3-dimensional graphic comprising a compressed modified image based on the image-modifying data; and
sending to the client device separate from the server the at least one image portion for display at the client device such that complex interactive games can be displayed at the client device in real-time, wherein said client device decompresses the compressed modified image but does not perform 3-dimensional graphics processing on the at least one image portion.

7. The method of claim 6, wherein said sending the at least one image portion is performed across at least one of an Internet, a WAN, a LAN, an Ethernet, or wireless communication.

8. The method of claim 6, further comprising receiving, at the server, input control signals generated by a user input device.

9. The method of claim 6, wherein the at least one image portion is compressed before sending to the client device.

10. The method of claim 9, wherein the at least one image portion is decompressed at the client device before being displayed.

11. The method of claim 6, wherein said at least one image portion comprises one or more frames.

12. The method of claim 6, wherein said at least one image portion comprises an amount of images generated during a specified elapsed time.

13. The method of claim 6, further comprising receiving, at the server, input control signals from the client device.

14. The method of claim 6, wherein said client device does not have sufficient processing power to both run a client-device-only version of a game application and display graphics corresponding to said version of said application at an acceptable frame rate.

15. A system comprising a processor and memory, the memory storing instructions for the processor to execute a method comprising:
receiving, at a server, image-modifying data corresponding to a generated image from a client device;
generating a compressed stream of images corresponding to 3-dimensional graphics, the compressed stream of images comprising a compressed modified image based on the image-modifying data; and
sending said compressed stream of images to the client device for display at the client device such that complex interactive games can be displayed at the client device in real-time, wherein the client device decompresses the compressed modified image but does not perform 3-dimensional graphics processing.

16. The system of claim 15, wherein said sending is performed across at least one of the Internet, a WAN, a LAN, an Ethernet, or wireless communication.

17. The system of claim 15, wherein the method further comprises receiving game control signals generated by a user input device.

18. The system of claim 17, wherein said game control signals are sent after a specified elapsed time.

19. The system of claim 15, wherein said compressed stream of images is decompressed at the client device before display.

20. The system of claim 15, wherein said client device does not have sufficient processing power to both run a client-device-only version of a game application and display graphics corresponding to said version of said game application at an acceptable frame rate.

\* \* \* \* \*